United States Patent
Zhuo et al.

(10) Patent No.: US 11,528,710 B2
(45) Date of Patent: Dec. 13, 2022

(54) TIME DOMAIN RESOURCE INDICATION METHOD IN RELAY NETWORK, NETWORK DEVICE, AND USER EQUIPMENT

(71) Applicant: HUAWEI TECHNOLOGIES CO., LTD., Shenzhen (CN)

(72) Inventors: Yibin Zhuo, Shanghai (CN); Zhongfeng Li, Shanghai (CN); Yi Qin, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 76 days.

(21) Appl. No.: 16/875,276

(22) Filed: May 15, 2020

(65) Prior Publication Data
US 2020/0280993 A1    Sep. 3, 2020

Related U.S. Application Data

(63) Continuation of application No. PCT/CN2018/111366, filed on Oct. 23, 2018.

(30) Foreign Application Priority Data

Nov. 17, 2017   (CN) .......................... 201711148341.3

(51) Int. Cl.
*H04W 4/00* (2018.01)
*H04W 72/04* (2009.01)
*H04W 8/24* (2009.01)

(52) U.S. Cl.
CPC ......... *H04W 72/0493* (2013.01); *H04W 8/24* (2013.01); *H04W 72/042* (2013.01); *H04W 72/0413* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2010/0142415 A1 | 6/2010 | Yu et al. | |
| 2010/0217817 A1* | 8/2010 | De Boer | ................. H04W 4/12 709/206 |

(Continued)

FOREIGN PATENT DOCUMENTS

| | | |
|---|---|---|
| CN | 102026361 A | 4/2011 |
| CN | 102387595 A | 3/2012 |

OTHER PUBLICATIONS

Intel Corporation, Discussion on Conflict/Collision-Free Sidelink UE-to-NW Relaying for Wearable and IoT Use Cases. 3GPP TSG RAN WG1 Meeting#90 , Prague, Czech Republic, Aug. 21 25, 2017, R1-1712517, 5 pages.

(Continued)

*Primary Examiner* — Clemence S Han
(74) *Attorney, Agent, or Firm* — Hauptman Ham, LLP

(57) ABSTRACT

A time domain resource indication method includes sending, by a first node, first time domain resource configuration information to at least one second node. The first time domain resource configuration information is used by the at least one second node to determine second time domain resource configuration information sent by the at least one second node to at least one third node. The first time domain resource configuration information indicates first time domain resources of a link between the first node and the at least one second node. The second time domain resource configuration information indicates second time domain resources of a link between the at least one second node and the at least one third node.

20 Claims, 9 Drawing Sheets

(56) References Cited

U.S. PATENT DOCUMENTS

| | | | |
|---|---|---|---|
| 2011/0176477 A1* | 7/2011 | Lee | H04B 7/15592 |
| | | | 370/315 |
| 2013/0051374 A1* | 2/2013 | Faurie | H04W 72/0446 |
| | | | 370/337 |
| 2014/0133367 A1* | 5/2014 | Chen | H04W 72/042 |
| | | | 370/279 |
| 2016/0183219 A1* | 6/2016 | Kim | H04W 72/0406 |
| | | | 370/329 |
| 2017/0064534 A1* | 3/2017 | Loehr | H04W 72/0413 |
| 2018/0115357 A1* | 4/2018 | Park | H04B 7/06 |
| 2018/0167961 A1* | 6/2018 | Hao | H04W 72/1205 |
| 2021/0297118 A1* | 9/2021 | Kwak | H04B 7/0452 |

OTHER PUBLICATIONS

Intel Corporation, Design Options for eNB-Controlled and Relay UE-Assisted Resource Allocation. 3GPP TSG RAN WG1 Meeting#90, Prague, Czech Republic, Aug. 21 25, 2017, R1-1712519, 7 pages.

Extended European Search Report issued in corresponding European Application No. 18878496.1, dated Oct. 19, 2020, pp. 1-9, European Patent Office, Munich, Germany.

International Search Report issued in corresponding International Application No. PCT/CN2018/111366, dated Jan. 17, 2019, State Intellectual Property Office of the P.R. China, Beijing, China.

\* cited by examiner

TIME DOMAIN RESOURCE INDICATION METHOD IN RELAY NETWORK, NETWORK DEVICE, AND USER EQUIPMENT

CROSS-REFERENCE TO RELATED APPLICATIONS

This application is a continuation of International Application No. PCT/CN2018/111366, filed on Oct. 23, 2018, which claims priority to Chinese Patent Application No. 201711148341.3, filed on Nov. 17, 2017. All of the aforementioned patent applications are hereby incorporated by reference in their entireties.

TECHNICAL FIELD

This application relates to the field of communications technologies, and in particular, to a time domain resource indication method in a relay network, a network device, and user equipment.

BACKGROUND

In a long term evolution (LTE) system and a future wireless communications system (for example, a fifth generation (5G) communications system), user equipment has increasingly high requirements on a rate and reliability. In addition, due to introduction of high-frequency communication, a coverage problem and a coverage hole problem that are caused by blocking become challenges for designing a new radio communications system. To improve coverage of a base station, relay transmission is introduced. A relay network system includes three types of nodes: a base station, a relay, and user equipment. On a path between the base station and the user equipment, a link whose transmission direction is the same as a direction from the base station to the user equipment is a downlink (DL), and a link whose transmission direction is the same as a direction from the user equipment to the base station is an uplink (UL). In the relay network system, for a device subject to a half-duplex constraint, time domain resources of neighboring links of the device may collide. In the prior art, there is no solution for the collision. Consequently, a transmission collision is usually caused.

SUMMARY

This application provides a time domain resource indication method, a network device, and user equipment. A first node sends first time domain resource configuration information to a second node, and/or the first node sends indication information to the second node, to resolve a technical problem that time domain resources of links of a half-duplex network device and/or user equipment in a multi-hop network system may collide.

A first aspect provides a time domain resource indication method, including: sending, by a first node, first time domain resource configuration information to at least one second node, where the first time domain resource configuration information is used to determine second time domain resource configuration information sent by the at least one second node, where the first time domain resource configuration information indicates first time domain resources of a link between the first node and the at least one second node, and the second time domain resource configuration information indicates second time domain resources of a link between the at least one second node and the at least one third node.

In a possible implementation of the first aspect, the method further includes: sending, by the first node, third indication information to the at least one second node, where the third indication information indicates a valid-from time domain indicated by the first time domain resource configuration information.

In a possible implementation of the first aspect, the method further includes: sending, by the first node, second indication information to the at least one second node, where the second indication information indicates that a last time domain unit indicated by the second time domain resource configuration information is the same as a last time domain unit indicated by the first time domain resource configuration information.

In a possible implementation of the first aspect, the method further includes: receiving, by the first node, fourth indication information sent by the at least one second node, where the indication information indicates at least some of the second time domain resources.

In a possible implementation of the first aspect, the method further includes: sending, by the first node, first indication information to the at least one second node, where the first indication information indicates a time domain in which the at least one second node sends the second time domain resource configuration information to the at least one third node.

In a possible implementation of the first aspect, before the sending, by the first node, first indication information to the at least one second node, the method further includes: receiving, by the first node, fifth indication information sent by the at least one second node, where the fifth indication information includes capability information of the at least one second node or a capability class of the at least one second node, where the capability information or the capability class is used by the first node to determine the time domain in which the at least one second node starts to send the second time domain resource configuration information.

In a possible implementation of the first aspect, that the first time domain resource configuration information is used to determine second time domain resource configuration information sent by the at least one second node includes: determining, based on at least some of the first time domain resources indicated by the first time domain resource configuration information, at least some of the second time domain resources indicated by the second time domain resource configuration information.

According to a second aspect, a time domain resource indication method is provided. The method includes: receiving, by a second node, first time domain resource configuration information sent by a first node; determining, by the second node, second time domain resource configuration information based on the first time domain resource configuration information; and sending, by the second node, the second time domain resource configuration information to at least one third node, where the first time domain resource configuration information indicates first time domain resources of a link between the first node and the at least one second node, and the second time domain resource configuration information indicates second time domain resources of a link between the second node and the at least one third node.

In a possible implementation of the second aspect, the method further includes: receiving, by the second node, third indication information sent by the first node, where the third indication information indicates a valid-from time domain indicated by the first time domain resource configuration information.

In a possible implementation of the second aspect, the method further includes: receiving, by the second node, second indication information sent by the first node, where the second indication information indicates that a last time domain unit indicated by the second time domain resource configuration information is the same as a last time domain unit indicated by the first time domain resource configuration information.

In a possible implementation of the second aspect, the method further includes: sending, by the second node, fourth indication information to the first node, where the fourth indication information indicates at least some of the second time domain resources.

In a possible implementation of the second aspect, the method further includes: receiving, by the second node, first indication information sent by the first node, where the first indication information is used to indicate a time domain in which the second configuration information is sent.

In a possible implementation of the second aspect, before the receiving, by the second node, first indication information sent by the first node, the method further includes:

sending, by the second node, fifth indication information to the first node, where the fifth indication information includes capability information of the second node or a capability class of the second node, and the capability information or the capability class is used by the first node to determine the time domain in which the second node sends the second time domain resource configuration information.

In a possible implementation of the second aspect, the determining, by the second node, second time domain resource configuration information based on the first time domain resource configuration information includes: determining, by the second node based on at least some of the first time domain resources indicated by the first time domain resource configuration information, at least some of the second time domain resources indicated by the second time domain resource configuration information.

In a possible implementation of the first aspect and/or the second aspect, the first time domain resources include at least one type of the following time domain resources: uplink time domain resources of first used time domain resources, downlink time domain resources of the first used time domain resources, and first unused time domain resources; or the second time domain resources include at least one type of the following time domain resources: uplink time domain resources of second used time domain resources, downlink time domain resources of the second used time domain resources, and second unused time domain resources.

In a possible implementation of the first aspect and/or the second aspect, the determining, based on at least some of the first time domain resources indicated by the first time domain resource configuration information, at least some of the second time domain resources indicated by the second time domain resource configuration information includes at least one of the following: uplink time domain resources of at least some of the second time domain resources are the same as at least some of the first unused time domain resources; uplink time domain resources of at least some of the second time domain resources are the same as downlink time domain resources of at least some of the first used time domain resources; downlink time domain resources of at least some of the second time domain resources are the same as at least some of the first unused time domain resources; and downlink time domain resources of at least some of the second time domain resources are the same as uplink time domain resources of at least some of the first used time domain resources.

In a possible implementation of the first aspect and/or the second aspect, the first time domain resources further include at least one type of the following time domain resources: uplink time domain resources of the first unused time domain resources, and downlink time domain resources of the first unused time domain resources; or the second time domain resources further include at least one type of the following time domain resources: uplink time domain resources of the second unused time domain resources, and downlink time domain resources of the second unused time domain resources.

In a possible implementation of the first aspect and/or the second aspect, that uplink time domain resources of at least some of the second time domain resources are the same as at least some of the first unused time domain resources includes: the uplink time domain resources of the at least some of the second time domain resources are the same as uplink time domain resources of at least some of the first unused time domain resources; or that downlink time domain resources of at least some of the second time domain resources are the same as at least some of the first unused time domain resources includes: the downlink time domain resources of the at least some of the second time domain resources are the same as downlink time domain resources of at least some of the first unused time domain resources.

A third aspect provides a time domain resource indication apparatus, including: a sending unit, configured to send first time domain resource configuration information to at least one second node, where the first time domain resource configuration information is used to determine second time domain resource configuration information sent by the at least one second node, where the first time domain resource configuration information indicates first time domain resources of a link between the first node and the at least one second node, and the second time domain resource configuration information indicates second time domain resources of a link between the at least one second node and the at least one third node.

In a possible implementation of the third aspect, the sending unit is further configured to send third indication information to the at least one second node, where the third indication information indicates a valid-from time domain indicated by the first time domain resource configuration information.

In a possible implementation of the third aspect, the sending unit is further configured to send second indication information to the at least one second node, where the second indication information indicates that a last time domain unit indicated by the second time domain resource configuration information is the same as a last time domain unit indicated by the first time domain resource configuration information.

In a possible implementation of the third aspect, the apparatus further includes: a receiving unit, where the receiving unit is configured to receive fourth indication information sent by the at least one second node, where the indication information indicates at least some of the second time domain resources.

In a possible implementation of the third aspect, the sending unit is further configured to send first indication information to the at least one second node, where the first indication information indicates a time domain in which the at least one second node sends the second time domain resource configuration information to the at least one third node.

In a possible implementation of the third aspect, the receiving unit is further configured to receive fifth indication information sent by the at least one second node, where the fifth indication information includes capability information of the at least one second node or a capability class of the at least one second node, and the capability information or the capability class is used by the first node to determine the time domain in which the at least one second node starts to send the second time domain resource configuration information.

In a possible implementation of the third aspect, that the first time domain resource configuration information is used to determine second time domain resource configuration information sent by the at least one second node includes: determining, based on at least some of the first time domain resources indicated by the first time domain resource configuration information, at least some of the second time domain resources indicated by the second time domain resource configuration information.

A fourth aspect provides a time domain resource indication apparatus, including: a receiving unit, configured to receive first time domain resource configuration information sent by a first node;

a processing unit, configured to determine second time domain resource configuration information based on the first time domain resource configuration information; and a sending unit, configured to send the second time domain resource configuration information to at least one third node, where the first time domain resource configuration information indicates first time domain resources of a link between the first node and the at least one second node, and the second time domain resource configuration information indicates second time domain resources of a link between the second node and the at least one third node.

In a possible implementation of the fourth aspect, the receiving unit is further configured to receive third indication information sent by the first node, where the third indication information indicates a valid-from time domain indicated by the first time domain resource configuration information.

In a possible implementation of the fourth aspect, the receiving unit is further configured to receive second indication information sent by the first node, where the second indication information indicates that a last time domain unit indicated by the second time domain resource configuration information is the same as a last time domain unit indicated by the first time domain resource configuration information.

In a possible implementation of the fourth aspect, the sending unit is further configured to send fourth indication information to the first node, where the fourth indication information indicates at least some of the second time domain resources.

In a possible implementation of the fourth aspect, the receiving unit is further configured to receive first indication information sent by the first node, where the first indication information is used to indicate a time domain in which the second configuration information is sent.

In a possible implementation of the fourth aspect, the sending unit is further configured to send fifth indication information to the first node, where the fifth indication information includes capability information of the second node or a capability class of the second node, and the capability information or the capability class is used by the first node to determine the time domain in which the second node sends the second time domain resource configuration information.

In a possible implementation of the fourth aspect, the processing unit is configured to determine, based on at least some of the first time domain resources indicated by the first time domain resource configuration information, at least some of the second time domain resources indicated by the second time domain resource configuration information.

In a possible implementation of the third aspect and/or the fourth aspect, the first time domain resources include at least one type of the following time domain resources: uplink time domain resources of first used time domain resources, downlink time domain resources of the first used time domain resources, and first unused time domain resources; or the second time domain resources include at least one type of the following time domain resources: uplink time domain resources of second used time domain resources, downlink time domain resources of the second used time domain resources, and second unused time domain resources.

In a possible implementation of the third aspect and/or the fourth aspect, the determining, based on at least some of the first time domain resources indicated by the first time domain resource configuration information, at least some of the second time domain resources indicated by the second time domain resource configuration information includes at least one of the following: uplink time domain resources of at least some of the second time domain resources are the same as at least some of the first unused time domain resources; uplink time domain resources of at least some of the second time domain resources are the same as downlink time domain resources of at least some of the first used time domain resources; downlink time domain resources of at least some of the second time domain resources are the same as at least some of the first unused time domain resources; and downlink time domain resources of at least some of the second time domain resources are the same as uplink time domain resources of at least some of the first used time domain resources.

In a possible implementation of the third aspect and/or the fourth aspect, the first time domain resources further include at least one type of the following time domain resources: uplink time domain resources of the first unused time domain resources, and downlink time domain resources of the first unused time domain resources; or the second time domain resources further include at least one type of the following time domain resources: uplink time domain resources of the second unused time domain resources, and downlink time domain resources of the second unused time domain resources.

In a possible implementation of the third aspect and/or the fourth aspect, that uplink time domain resources of at least some of the second time domain resources are the same as at least some of the first unused time domain resources includes: the uplink time domain resources of the at least some of the second time domain resources are the same as uplink time domain resources of at least some of the first unused time domain resources; or that downlink time domain resources of at least some of the second time domain resources are the same as at least some of the first unused time domain resources includes: the downlink time domain resources of the at least some of the second time domain resources are the same as downlink time domain resources of at least some of the first unused time domain resources.

According to a fifth aspect, a network device is provided. The network device includes a memory, a processor, a receiver, and a transmitter. The memory stores an instruction, and when the instruction is executed by the processor, the processor is configured to perform the method according to the first aspect or the second aspect, or the processor is configured to instruct the transmitter to perform the method according to the first aspect or the second aspect.

According to a sixth aspect, UE is provided. The UE includes a memory, a processor, and a transceiver. The memory stores an instruction. When the instruction is executed by the processor, the processor is configured to perform the method according to the second aspect, or the processor is configured to instruct the transceiver to perform the method according to the second aspect.

According to a seventh aspect, a computer-readable storage medium is provided. The computer-readable storage medium stores an instruction, and when the instruction is run on a computer, the computer is enabled to perform the method according to the first aspect or the second aspect.

According to an eighth aspect, a program product is provided. The program product includes an instruction, and when the instruction is run on a computer, the computer is enabled to perform the method according to the first aspect or the second aspect.

According to a ninth aspect, a chip is provided. The chip includes at least one circuit, and the circuit is configured to perform the method according to any one of the first aspect or the second aspect.

BRIEF DESCRIPTION OF DRAWINGS

To describe the technical solutions in this application or in the prior art more clearly, the following briefly describes the accompanying drawings required for describing embodiments. Apparently, the accompanying drawings in the following descriptions show some embodiments of this application, and a person of ordinary skill in the art may still derive other drawings from these accompanying drawings without creative efforts.

DESCRIPTION OF EMBODIMENTS

Figure 1:
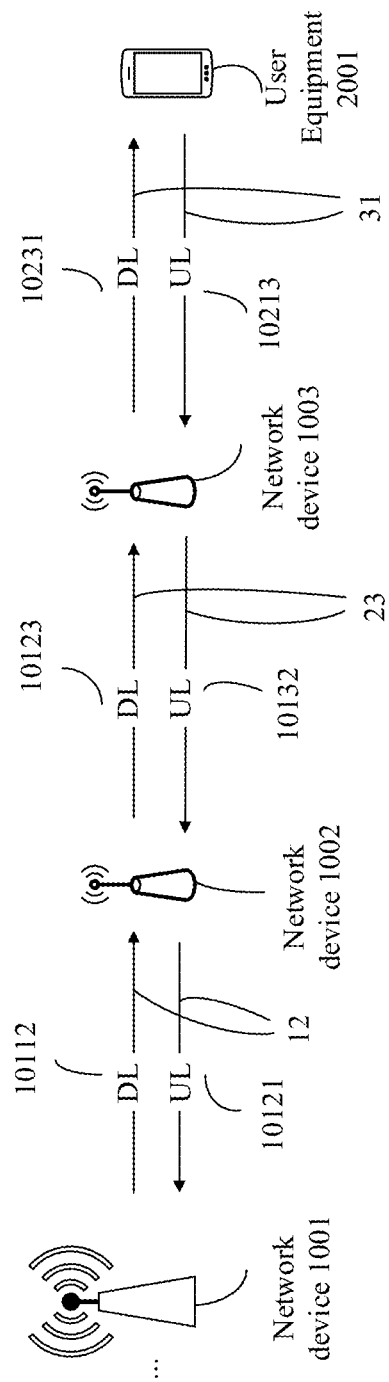
FIG. 1 is a schematic diagram of a possible system, in accordance with one or more embodiments.

The terms used in this application are merely for the purpose of describing a possible implementation, but are not intended to limit this application. The terms "a", "said" and "the" of singular forms used in the embodiments and the appended claims of this application are also intended to include plural forms, unless otherwise specified in the context clearly. The term "and/or" used in this application indicates and includes one or all possible combinations of one or more associated listed items. The term "include" adopted in this application specifies presence of features, data, information, integers, steps, operations, elements, and/or components, but does not exclude presence or attachment of other features, data, information, integers, steps, operations, components, elements, and/or their combinations. The term "indication" used in this application may include "explicit indication" and/or "implicit indication". A sequence of steps in this application may be freely arranged. This is not limited in this application. Even if a step is marked with a sequence number, the sequence number is used only to simplify description. In practice, the steps may not be performed according to the sequence numbers or may be simultaneously performed.

Some terms in this application are first described, to help a person skilled in the art has better understanding.

(1) A network device may be any device having a wireless transceiver function. The device includes but is not limited to a network device (for example, a network device NodeB, an evolved network device eNodeB, a network device (gNB) in a 5th generation (5G) communications system, a network device in a future communications system, an access node in a Wi-Fi system, a wireless relay node, or a wireless backhaul node) and the like. The network device may alternatively be a radio controller in a cloud radio access network (CRAN) scenario. The network device may alternatively be a network device in a 5G network, a network device in a future evolved network, a wearable device, a vehicle-mounted device, or the like. Alternatively, the network device may be a small cell, a transmission reference point (TRP), or the like. Certainly, this application is not limited thereto. (2) A base station may also be referred to as a base station device, and is a device deployed in a radio access network to provide a wireless communication function. The base station may have different names in different radio access systems. For example, the base station in a universal mobile telecommunications system (UMTS) network is referred to as a NodeB, the base station in an LTE network is referred to as an evolved NodeB (evolved NodeB, eNB or eNodeB for short), and the base station in a future 5G system may be referred to as a transmission reception point (TRP), a network node, or a g-NodeB (g-Node, gNB).

(2) User equipment (UE) is a device having a wireless transceiver function, may interact with a network device, may be deployed on land, and includes an indoor device, an outdoor device, a handheld device, a wearable device, or a vehicle-mounted device; or may be deployed on a water surface (such as on a ship); or may be deployed in air (such as in an aircraft, a balloon, and a satellite). The UE may be a mobile phone, a tablet computer (Pad), a computer with a wireless transceiver function, a virtual reality (VR) UE device, an augmented reality (AR) UE device, wireless UE in industrial control (industrial control), wireless UE in self driving, wireless UE in telemedicine, wireless UE in smart grid, wireless UE in transportation safety, wireless UE in smart city, wireless UE in smart home, or the like. An application scenario is not limited in the embodiments of this application. The UE may be a device that can communicate with the network device. The UE may also be sometimes referred to as a terminal device, an access terminal device, a UE unit, a UE station, a mobile station, a mobile station, a remote station, a remote terminal device, a mobile device, a wireless communications device, a UE proxy, a terminal apparatus, or the like.

(3). The nouns "network" and "system" are usually interchangeably used, but meanings of the nouns can be understood by a person skilled in the art. "Information", "signal", "message", and "channel" may be interchangeably used sometimes. It should be noted that meanings expressed by the terms are consistent when differences of the terms are not emphasized. "Of", "corresponding", and "relevant)" may be interchangeably used sometimes. It should be noted that meanings expressed by the terms are consistent when differences are not emphasized.

The following describes the solutions of this application with reference to the accompanying drawings.

FIG. 1 is a schematic diagram of a possible system according to this application. As shown in FIG. 1, the system includes a network device 1001, a network device 1002, a network device 1003, and user equipment 2001. It should be understood that, before the network device 1001, the system may further include at least one network device, which is shown by using an ellipsis in the figure. The network device 1001 cannot directly communicate with the user equipment 2001 due to a distance or another reason, and relay needs to be performed by using the network device 1002 and the network device 1003. Therefore, the network device 1002 and the network device 1003 may be referred to as relays or relay nodes, and the network device 1002 and the network device 1003 may be transmission nodes. If the network device before the network device 1001 is not included, the network device 1001 may be a base station. If the network device before the network device 1001 is further included, the network device 1001 may also be referred to as a relay, and may be a transmission node. The system shown in FIG. 1 includes at least two relays, and therefore may be referred to as a multi-hop network system.

In the system shown in FIG. 1, a link (such as links 10112, 10123, and 10231) in a direction of sending data by the network device to the user equipment may be referred to as a downlink (DL). A link (such as links 10121, 10132, 10213) in a direction of sending data by the user equipment to the network device may be referred to as an uplink (UL). The downlink 10112 and the uplink 10121 may be collectively referred to as a link 12 between the network device 1001 and the network device 1002, the downlink 10123 and the uplink 10132 may be collectively referred to as a link 23 between the network device 1002 and the network device 1003, and the downlink 10231 and the uplink 10213 may be collectively referred to as a link 31 between the network device 1003 and the user equipment 2001. The network device 1001 may be referred to as a first node, the network device 1002 may be referred to as a second node, the network device 1003 may be referred to as a third node, and the user equipment 2001 may be referred to as a fourth node.

The following describes the technical solution of this application by using the network device 1001 and the network device 1002 as an example. It should be understood that the technical solution of this application may also be used for the network device 1003 and the user equipment 2001, and other similar network device and terminal device. In this application, the network device 1001 sends time domain resource configuration information 100 and time domain indication information to the network device 1002, to indicate how the network device 1002 configures time domain resource configuration information 200 and when to send the time domain resource configuration information 200. This resolves a problem that time domain resources of the link 12 and the link 23 of the half-duplex network device 1001 and/or the half-duplex network device 1002 in the multi-hop network system may collide. The time domain resource configuration information 100 indicates allocation of at least some of time domain resources of the link 12. The time domain resource configuration information 200 indicates allocation of at least some of time domain resources of the link 23.

Figure 2:
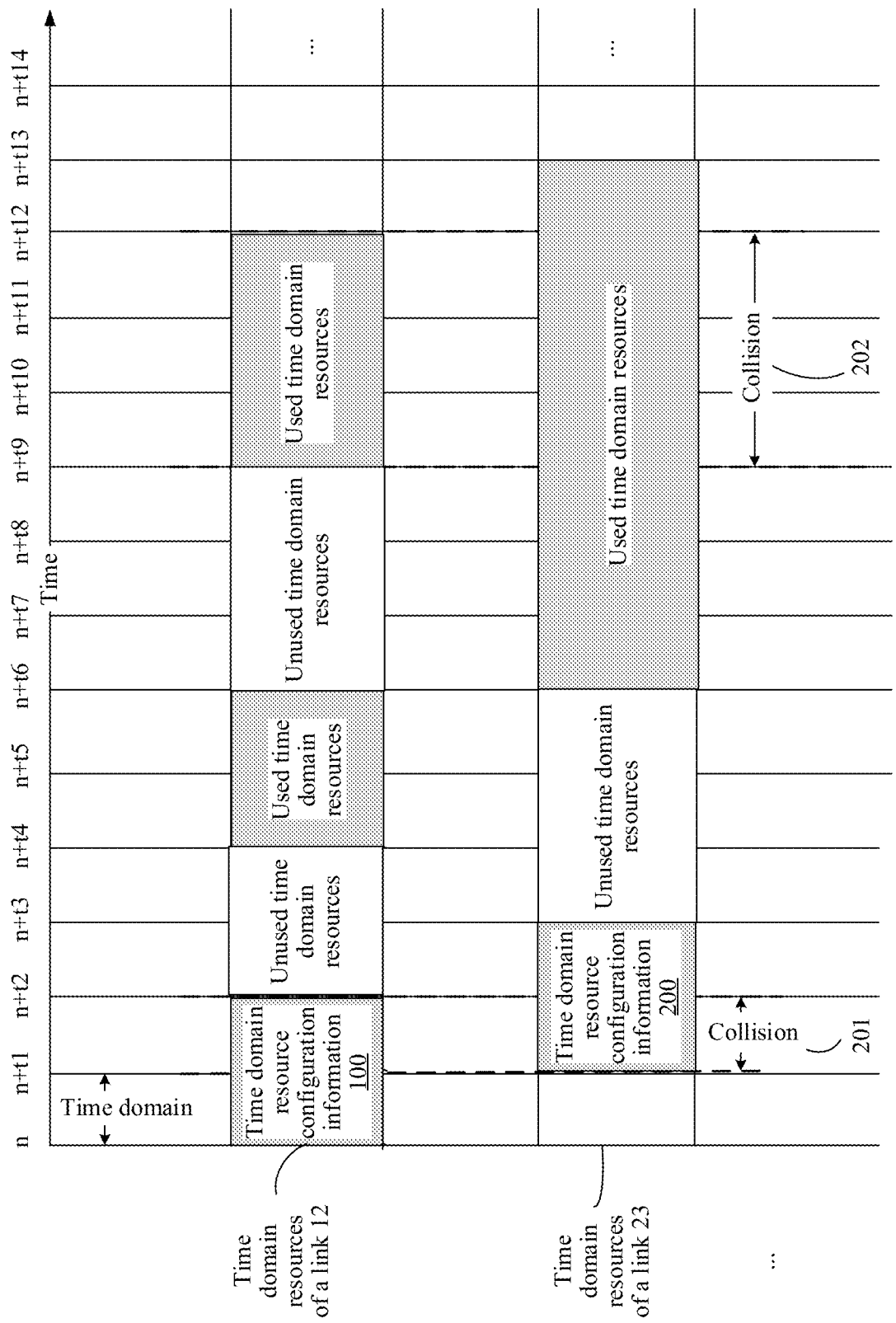
FIG. 2 is a schematic diagram of a collision of time domain resources in a relay network, in accordance with one or more embodiments.

The following describes the collision of the time domain resources of the link 12 and the link 23 by using FIG. 2 as an example. FIG. 2 is a schematic diagram of a collision of time domain resources in a relay network according to this application. If the network device 1001 or the network device 1002 cannot perform full-duplex transmission, that is, cannot receive and send data at the same time, time domain resources of the link 12 and the link 23 collide. As shown in FIG. 2, the network device 1002 receives the time domain resource configuration information 100 from n to n+t2, and sends the time domain resource configuration information 200 from n+t1 to n+t3. In this case, there is a collision 201 from n+t1 to n+t2. For another example, the time domain resource configuration information 100 indicates that time domain resources from n+t9 to n+t12 are used resources. The network device 1002 receives information from and sends information to the network device 1001 from n+t9 to n+t12. In addition, n+t6 to n+t13 are indicated as used resources by the time domain resource configuration information 200. The network device 1002 receives information from and sends information to the network device 1003 from n+t6 to n+t13. In this case, there is a collision 202 from n+t9 to n+t12. Therefore, the network device 1001 needs to indicate when the network device 1002 sends the time domain resource configuration information 200, and how the time domain resource configuration information 200 indicates time domain resources of the link 23, including the first time domain unit (namely, a valid-from time domain) indicated by the time domain resource configuration information 200, a last time domain unit (namely, an invalid-from time domain) indicated by the time domain resource configuration information 200, a time domain length indicated by the time domain resource configuration information 200, and used time domain resources and unused time domain resources that are in this time domain.

In this application, a time domain unit may be a frame, a subframe, a slot, a mini-slot, a symbol, or the like. This is not limited in this application. In this application, a plurality of types of time domain units may coexist. When there are a plurality of types of time domain units, a used time domain unit may further be indicated. An indication in this application may be indicated by sending indication information, or may be indicated by sending time domain resource configuration information. The time domain resource configuration information and other indication information (for example, sending time domain indication information, last time domain unit indication information, valid-from time domain indication information, and collided time domain resource indication information) may be sent by using one piece of signaling, or may be sent by using a plurality of pieces of signaling. The signaling may be carried on a physical layer (for example, downlink channel information (DCI) and uplink channel information (UCI)), a MAC layer (for example, a MAC CE), or an RRC layer (for example, RRC signaling).

The following describes how the network device 1002 configures the time domain resource configuration information 200 to indicate the time domain resources of the link 23, that is, how the network device 1002 determines the time domain resource configuration information 200 based on the time domain resource configuration information 100. S601: The network device 1001 sends the time domain resource configuration information 100 to the network device 1002. The time domain resource configuration information 100 is used to indicate at least some of the time domain resources of the link 12. S602: The network device 1002 determines the time domain resource configuration information 200 based on the time domain resource configuration information 100. The network device 1002 determines, based on the at least some of the time domain resources that are indicated by the time domain resource configuration information 100, at least some of the time domain resources that are indicated by the time domain resource configuration information 200, that is, determines, based on a type of the at least some of the time domain resources that are indicated by the time domain resource configuration information 100, a type of the at least some of the time domain resources that are indicated by the time domain resource configuration information 200. The time domain resources include at least one type of the following time domain resources: used time domain resources and unused time domain resources. Optionally, the time domain resource configuration information may further indicate an uplink direction and a downlink direction of the time domain resources. The used time domain resources further include at least one type of the following time domain resources: uplink time domain resources of the used time domain resources and downlink time domain resources of the used time domain resources. The unused time domain resources include at least one type of the following time domain resource types: uplink time domain resources of the unused time domain resources and downlink time domain resources of the unused time domain resources.

Figure 4:
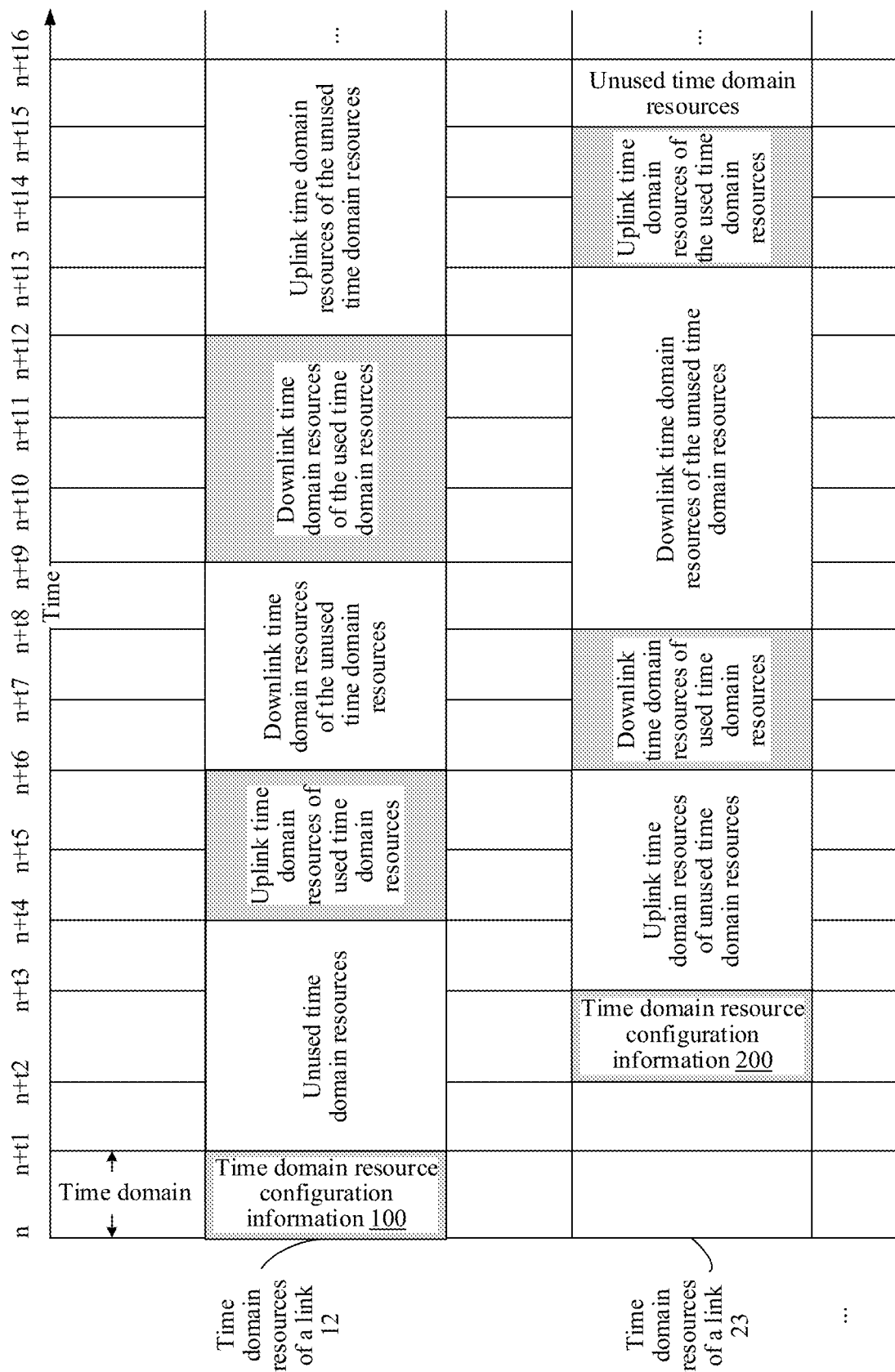
FIG. 4 is a schematic diagram of a method, in accordance with one or more embodiments.

FIG. 4 is a schematic diagram of determining, based on a time domain resource indicated by time domain resource configuration information 100, a time domain resource indicated by time domain resource configuration information 200 according to this application. A rule for determining, based on the at least some of the time domain resources that are indicated by the time domain resource configuration information 100, the at least some of the time domain resources that are indicated by the time domain resource configuration information 200 is shown in Table 1. The unused resources may be understood as resources that are flexibly configurable or unknown resources other than the used resources.

TABLE 1

| Unused time domain resources whose uplink direction and downlink direction are not limited | |
|---|---|
| At least some of the time domain resources that are indicated by the time domain resource configuration information 100 | At least some of the time domain resources that are indicated by the time domain resource configuration information 200 |
| Downlink time domain resources of the used time domain resources | Uplink time domain resources of the used time domain resources or the unused time domain resources (others) |
| Uplink time domain resources of the used time domain resources | Downlink time domain resources of the used time domain resources or the unused time domain resources |
| Unused time domain resources | Uplink time domain resources of the used time domain resources, downlink time domain resources of the used time domain resources, or the unused time domain resources (others) |
| Unused time domain resources whose uplink direction and downlink direction are limited | |
| At least some of the time domain resources that are indicated by the time domain resource configuration information 100 | At least some of the time domain resources that are indicated by the time domain resource configuration information 200 |
| Downlink time domain resources of the used time domain resources | Uplink time domain resources of the used time domain resources, uplink time domain resources of the unused time domain resources, or downlink time domain resources of the unused time domain resources |
| Uplink time domain resources of the used time domain resources | Downlink time domain resources of the used time domain resources, uplink time domain resources of the unused time domain resources, or downlink time domain resources of the unused time domain resources |
| Downlink time domain resources of the unused time domain resources | Downlink time domain resources of the used time domain resources, uplink time domain resources of the unused time domain resources, or downlink time domain resources of the unused time domain resources |
| Uplink time domain resources of the unused time domain resources | Uplink time domain resources of the used time domain resources, uplink time domain resources of the unused time domain resources, or downlink time domain resources of the unused time domain resources |

It should be understood that "or" in Table 1 may also represent an "and" relationship. For example, "Uplink time domain resources of the used time domain resources, downlink time domain resources of the used time domain resources, or the unused time domain resources" may include at least one of the following cases: All of the time domain resources are uplink time domain resources of the used time domain resources; all of the time domain resources are downlink time domain resources of the used time domain resources; all of the time domain resources are unused time domain resources; some of the time domain resources are uplink time domain resources of the used time domain resources, and some of the time domain resources are unused time domain resources; some of the time domain resources are downlink time domain resources of the used time domain resources, and some of the time domain resources are unused time domain resources; some of the time domain resources are uplink time domain resources of the used time domain resources, some of the time domain resources are downlink time domain resources of the used time domain resources, and some of the time domain resources are unused time domain resources. In addition, a feasible time domain resource configuration solution is provided herein only by way of example, but does not constitute a limitation on other embodiments.

With reference to the accompanying drawings, the following describes how the network device 1002 obtains the last time domain unit (namely, an end time domain) indicated by the time domain resource configuration information 200 and the first time domain unit (namely, a valid-from time domain) indicated by the time domain resource configuration information 100.

Figure 5:
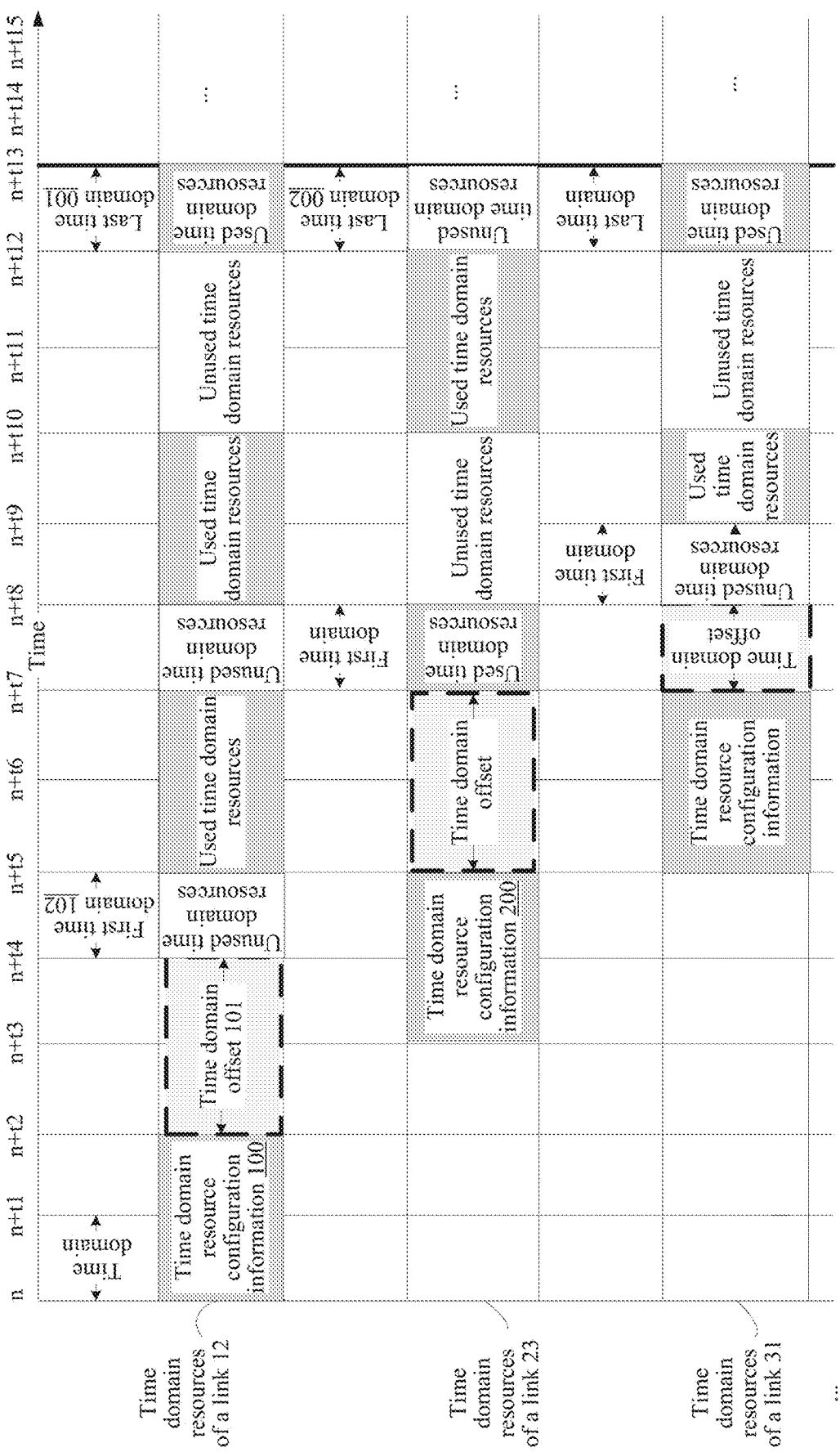
FIG. 5 is a schematic diagram in which end time domain resources indicated by time domain resource configuration information are aligned, in accordance with one or more embodiments.
Figure 6:
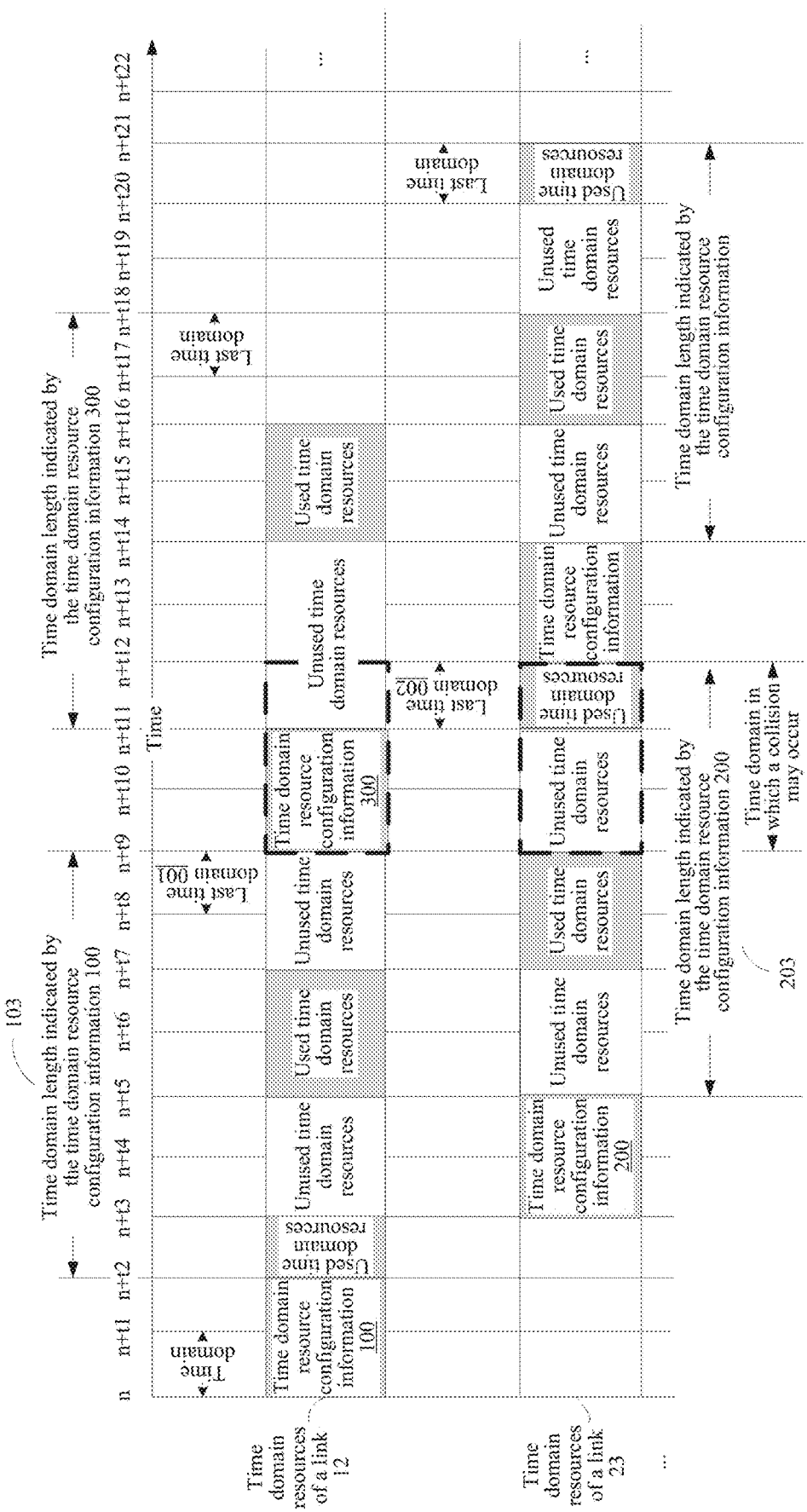
FIG. 6 is a schematic diagram in which end time domain resources indicated by time domain resource configuration information are not aligned, in accordance with one or more embodiments.

FIG. 5 is a schematic diagram in which end time domain resources indicated by time domain resource configuration information are aligned; As shown in FIG. 5, a last time domain unit 002 indicated by the time domain resource configuration information 200 may be the same as a last time domain unit 001 indicated by the time domain resource configuration information 100. This may be referred to as end time domain alignment. FIG. 6 is a schematic diagram in which end time domain resources indicated by time domain resource configuration information are not aligned; As shown in FIG. 6, if the last time domain unit 002 indicated by the time domain resource configuration information 200 may be different from the last time domain unit 001 indicated by the time domain resource configuration information 100, this may be referred to as end time domain misalignment. The network system in this application may use the end time domain alignment or the end time domain misalignment. Certainly, the two manners may alternatively be simultaneously used in one system.

For the end time domain alignment, the network device 1002 may obtain the last time domain unit 002 by using three possible methods. A first method is to obtain the last time domain unit 002 based on last time domain unit indication information sent by the network device 1001. A second method is to obtain the last time domain unit 002 based on last time domain unit relationship indication information and the time domain resource configuration information 100 that are sent by the network device 1001. A third method is to obtain the last time domain unit 002 based on a time domain resource configuration information 100 sent by the network device 1001. In the first method, the network device 1001 sends the last time domain unit indication information to the network device 1002. The last time domain unit indication information may directly indicate the last time domain unit 002. The network device 1002 obtains the last time domain unit 002 based on the last time domain unit indication information. In the second method, the network device 1001 sends the last time domain unit relationship indication information and the time domain resource configuration information 100. The network device 1002 obtains, based on the time domain resource configuration information 100, the last time domain unit 001 indicated by the time domain resource configuration information 100; and the network device 1002 obtains, based on the last time domain unit relationship indication information, that the last time domain unit 002 is the same as the last time domain unit 001. In this case, the network device 1002 may obtain a time domain in which the last time domain unit 002 is located. In the third method, the network device 1001 sends the time domain resource configuration information 100. The network device 1002 obtains the last time domain unit 001 based on the time domain resource configuration information 100. According to system presetting, the last time domain unit 002 is the same as the last time domain unit 001, and the network device 1002 may obtain the last time domain unit 002.

Optionally, the network device 1002 may obtain the valid-from time domain of the time domain resource configuration information 100 after the network device 1001 sends valid-from time domain indication information to the network device 1002. The valid-from time domain indication information indicates the valid-from time domain of the time domain resource configuration information 100. The valid-from time domain indication information may indicate the first valid (or may be referred to as indicated) time domain unit 102 of the time domain resource configuration information 100. The valid-from time domain indication information may further indicate a time domain offset 101. The network device 1002 obtains the valid-from time domain of the time domain resource configuration information 100 based on the time domain offset 101. If the first valid-from time domain unit of the time domain resource configuration information 100 is not indicated, by default, the first valid-from time domain unit of the time domain resource configuration information 100 is the first time domain unit after the network device 1002 receives the time domain resource configuration information 100.

For the end time domain misalignment, as shown in FIG. 6, a time domain length 203 indicated by the time domain resource configuration information 200 is the same as a time domain length 103 indicated by the time domain resource configuration information 100. In a misalignment scenario, if the time domain length 203 is less than the time domain length 103, some time-frequency resources may be wasted. If the time domain length 203 is greater than the time domain length 103, a difficulty of resolving a collision is greatly increased. Therefore, the time domain length 203 is usually the same as the time domain length 103. Certainly, when the technical problems in this application can be resolved, the time domain length 203 may alternatively be different from the time domain length 103. There may be three methods for determining the time domain length. In a first method, the network device 1002 determines the time domain length 203 based on a time domain length preset by a system. In a second method, the network device 1001 sends the time domain resource configuration information 100 to the network device 1002, and the network device 1002 obtains the time domain length 203 based on the time domain resource configuration information 100. In a third method, the network device 1001 sends the time domain resource configuration information 100 to the network device 1002. The network device 1002 obtains the time domain length 103 based on the time domain resource configuration information 100, and then obtains the time domain length 203 with reference to system pre-configuration that the time domain length 203 is the same as the time domain length 103.

Optionally, for a case in which end time domains are not aligned, there may be a collision from a time domain unit in which the network device 1001 starts to send time domain resource configuration information 300 to the last time domain unit indicated by the time domain resource configuration information 200. The time domain resource configuration information 300 is time domain resource configuration information sent by the network device 1001 after the network device 1001 sends the time domain resource configuration information 100, and the time domain resource configuration information 300 indicates at least some of the time domain resources of the link 12. For example, as shown in FIG. 6, from n+t9 to n+t12, if the time domain resource configuration information 200 indicates that n+t9 to n+t11 are used time domain resources, there is a collision from n+t9 to n+t11. Alternatively, if the time domain resource configuration information 300 indicates that n+t11 to n+t12 are used resource, there is also a collision from n+t11 to n+t12. Therefore, before the network device 1001 sends the time domain resource configuration information 300 to the network device 1002, the network device 1001 needs to receive collided time domain resource indication information sent by the network device 1002. The collided time domain resource indication information is used to indicate at least some of time domain resources indicated by the time domain resource configuration information 200. For example, as shown in FIG. 6, the collided time domain resource indication information indicates a configuration status of time domain resources from n+t9 to n+t12.

Optionally, for the foregoing collision, time domain resources from the time domain unit in which the network device 1001 starts to send the time domain resource in the time domain resource configuration information 300 to the last time domain unit indicated by the time domain resource configuration information 200 may be preconfigured through system presetting. The time domain resource configuration information 200 and/or the time domain resource configuration information 300 are/is indicated based on a predefined configuration status.

With reference to the accompanying drawings, the following describes how the network device 1002 obtains the time domain resource configuration information 200 and when the network device 1002 sends the time domain resource configuration information 200.

S401: The network device 1001 obtains, based on a sending time domain and capability indication information that are of the time domain resource configuration information 100, a time domain in which the network device 1002 sends the time domain resource configuration information 200.

Figure 3:
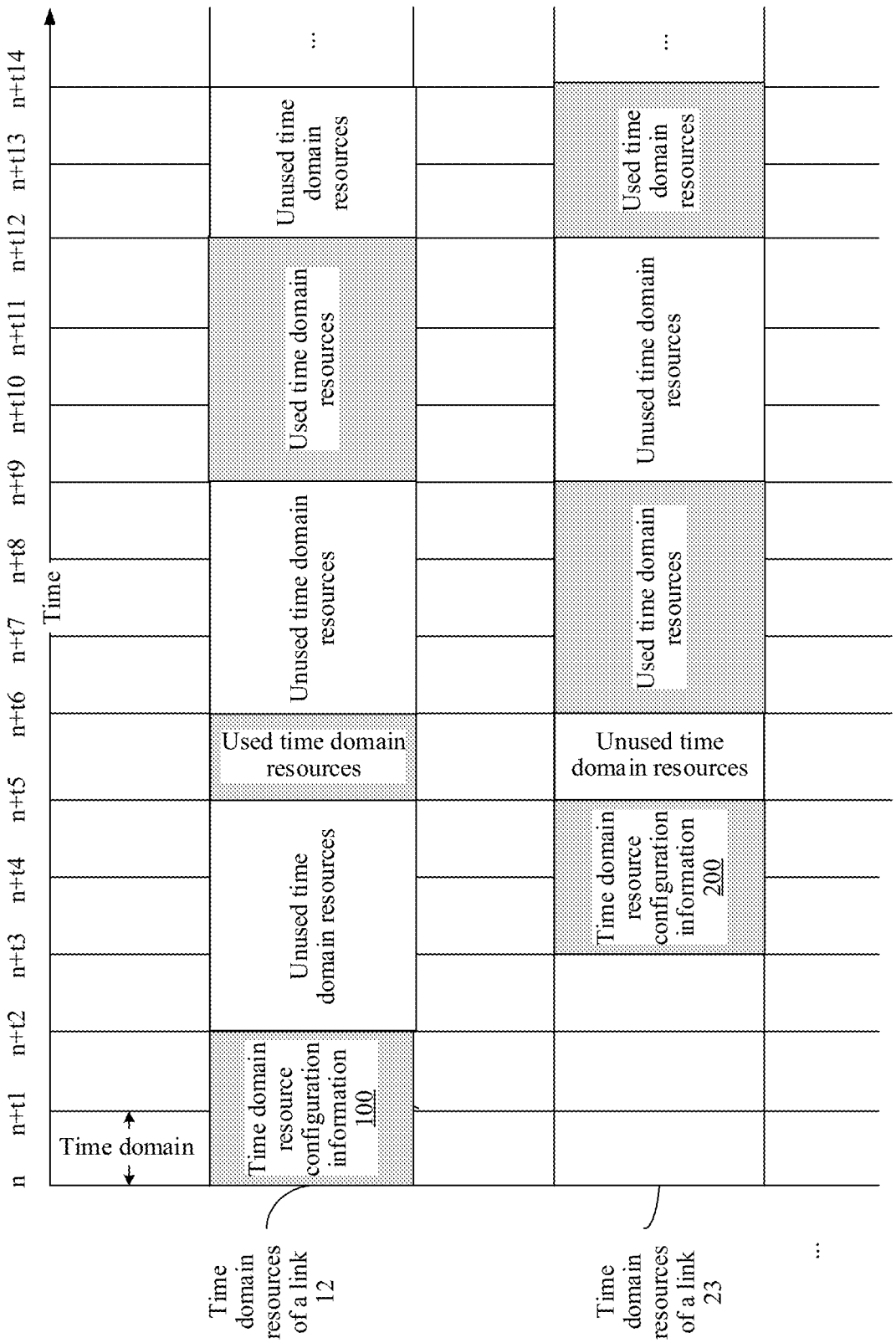
FIG. 3 is a schematic diagram of time domain resources occupied for sending time domain resource configuration information, in accordance with one or more embodiments.

In this application, any network device 1001 may serve one or more network devices 1002, and any network device 1002 may serve one or more network devices 1003. If serving one network device 1002, the network device 1001 determines, based on a capability of the network device 1002 and a time domain in which the network device 1001 sends the time domain resource configuration information 100, a time domain in which the network device 1002 sends the time domain resource configuration information 200. If the network device 1001 serves a plurality of network devices 1002, the network device 1001 determines, with comprehensive consideration of capabilities of the network devices 1002, time domains in which the network devices 1002 send the time domain resource configuration information 200. For example, as shown in FIG. 3, the network device 1001 sends the time domain resource configuration information 100 at a time n, and obtains, based on the capability indication information, that a minimum time domain of the network device 1002 is t3. In this case, it is determined that the network device 1002 sends the time domain resource configuration information 200 on an available downlink at n+t3 or after n+t3.

The capability indication information indicates the minimum time domain from receiving the time domain resource configuration information 100 by the network device 1002 to sending the time domain resource configuration information 200 by the network device 1002. Considering a half-duplex problem, the network device 1002 needs to send the time domain resource configuration information 200 of the network device 1002 after receiving the time domain resource configuration information 100 sent by the network device 1001. Receiving devices of the time domain resource configuration information 100 may be a group of network devices, and capabilities of the network devices in this group of network devices may be different. In other words, minimum time domains from receiving the time domain resource configuration information 100 by the network devices to sending the time domain resource configuration information 200 by the network devices may be different. In addition, in this application, if the different network devices send their respective time domain resource configuration information 200 at different times, considering that time division multiplexing needs to be performed on control signals and data signals, the network device 1001 needs to reserve time domain resources at a plurality of positions. This causes a waste of time domain resources. Therefore, the network device 1001 needs to indicate, to the network device 1002, a time when the network device 1002 sends the time domain resource configuration information 200.

The capability indication information indicates capability information or a capability class of the network device 1002. The capability information may directly indicate the minimum time domain required by the network device 1002. The capability class may be a capability class obtained after the network device 1002 performs processing in a predefined quantization manner. The network device 1001 obtains, based on the capability class, the minimum time domain required by the network device 1002.

There are two possible methods for obtaining the capability indication information by the network device 1001. In one method, the network device 1002 sends the capability indication information to the network device 1001. In the other method, the capability indication information of the network device 1002 is preset by the system. In this case, the network device 1001 does not need to receive the indication information from the network device 1002.

Optionally, the capability indication information may further indicate at least one of the following information: load, a throughput, and a service priority. The load includes load of the link 12, and/or load of the link 23, and/or load of the link 31. The throughput includes: a throughput of the link 12, and/or a throughput of the link 23, and/or a throughput of the link 31. It should be understood that any one of the foregoing information may alternatively be indicated by sending, by the network device 1002, load indication information and/or throughput indication information to the network device 1001.

S402: The network device 1002 receives sending time domain indication information sent by the network device 1001. The sending time domain indication information indicates the time domain in which the network device 1002 sends the time domain resource configuration information 200.

Optionally, in the time domain in which the network device 1001 instructs the network device 1002 to send the time domain resource configuration information 200, the network device 1001 may further predefine a fixed value M by using the system or in a protocol. After receiving the time domain configuration information 100 in the time domain n, the network device 1002 sends the time domain resource configuration information 200 in a time domain n+M.

The following provides another time domain resource indication method in a relay network. To support indication of time domain resources in a multi-hop network, an indication function of time domain resource configuration information may be extended. The following mainly uses a network device 1001 and a network device 1002 as an example to describe the solution of this application. It should be understood that the solution may be used in any network device and terminal device in a multi-hop network.

Optionally, it is preset that only time domain resource blocks whose sequence numbers are 0 are used on a link between any two network devices. The time domain resource blocks are at least some of time domain resources of the link. The network device 1001 sends time domain resource configuration information 100 to the network device 1002. The information includes k+1 time domain resource blocks. k is a quantity of relays in the network other than the network device 1001, and sequence numbers of the k+1 groups of time domain resource blocks are 0 to k. After receiving the time domain resource configuration information 100, the network device 1002 and the network device 1001 use the time domain resource blocks whose sequence numbers are 0 to perform transmission. After subtracting 1 from a sequence number of each unused time domain resource block, the network device 1002 sends time domain resource configuration information 200 to a network device 1003. The time domain resource configuration information 200 includes the unused time domain resource blocks and k time domain resource blocks.

Optionally, during time domain resource configuration, considering that interference between non-neighboring links is relatively small, a same time-frequency resource block may be used in a next-next hop or a previous-previous hop. An identifier (ID or filed) may be used to indicate that the hop in the multi-hop relay network is an odd hop or an even hop, indicate a configuration status of time domain resources in the odd hop and/or the even hop, and preset that an odd-hop time domain resource is used in the odd hop and an even-hop time domain resource is used in the even hop.

Optionally, it is preset that only time domain resource blocks whose sequence numbers are 0 are used on a link between any two network devices. Time-frequency resource configuration information 100 indicates two time domain resource blocks whose sequence numbers are 0 and 1. The network device 1002 uses the time domain resource block whose sequence number is 0 to perform transmission with the network device 1001. The network device 1002 exchanges the sequence numbers of the two time domain resource blocks, and then sends time-frequency resource configuration information 200. The time-frequency resource configuration information 200 indicates the two time domain resource blocks whose sequence numbers are 0 and 1.

Figure 7:
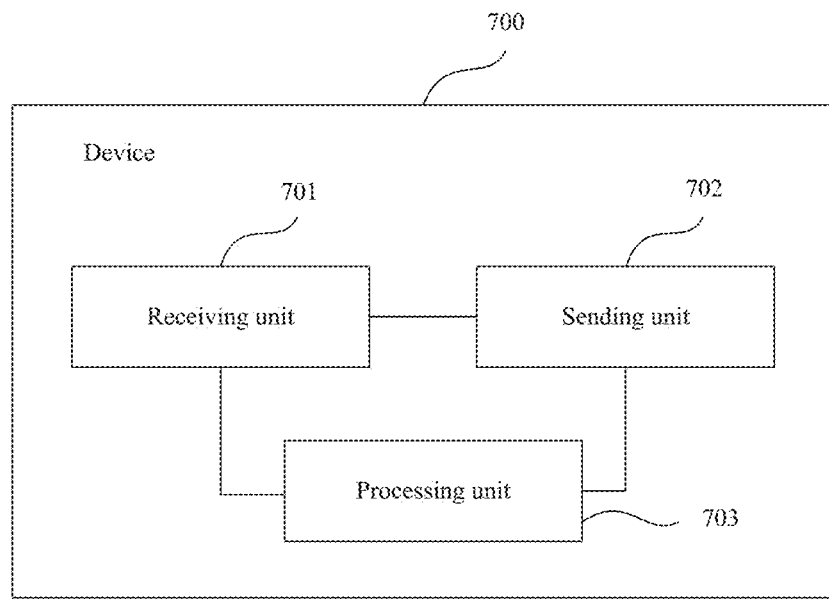
FIG. 7 is a schematic structural diagram of a device, in accordance with one or more embodiments.

The network device or the UE in this application may be divided into function units in the following with reference to one or more of the foregoing methods. For example, the function units may be obtained through division based on corresponding functions, or two or more functions may be integrated into one unit. All or some of the foregoing integrated units may be implemented by using software, hardware, firmware, or any combination thereof. It should be noted that, in this application, division into the units is an example, and is merely a logical function division. During actual implementation, another division manner may be used. FIG. 7 is a schematic structural diagram of a device 700 according to this application. The device 700 may be applied to implement the network device or the UE in this application. Referring to FIG. 7, the device 700 includes a receiving unit 701, a sending unit 702, and a processor unit 703. It should be understood that, with reference to any one or more of the foregoing methods, the network device and the UE may further include more function units, configured to implement more functions, so as to prevent a collision.

For example, the function units may be obtained through division based on corresponding functions, or two or more functions may be integrated into one unit. All or some of the foregoing integrated units may be implemented by using software, hardware, firmware, or any combination thereof. It should be noted that, in this application, division into the units is an example, and is merely a logical function division. During actual implementation, another division manner may be used. FIG. 7 is a schematic structural diagram of a device 100 according to this application. The device 100 may be applied to implement the network device or the UE in this application. Referring to FIG. 7, the device 100 includes a receiving unit 101, a sending unit 102, and a processor unit 103. It should be understood that, with reference to any one or more of the foregoing methods, the network device and the UE may further include more function units, configured to implement more functions, so as to prevent a collision.

When the network device or the UE is implemented in a form of hardware, for a concept, an explanation, a detailed description, a method, a procedure, a step, and the like related to this application, refer to descriptions about the content in the foregoing embodiments. In this application, the receiving unit may be implemented by using a communications interface, a receiver, a receiving circuit, or the like. The sending unit may be implemented by using a communications interface, a transmitter, a sending circuit, or the like. It should be understood that functions of the receiving unit and the sending unit may be integrated together, and are implemented by using a communications interface, a transceiver, or a transceiver circuit. The communications interface is a collective term, and may include one or more interfaces.

It may be understood that the foregoing descriptions are merely simplified examples of a hardware form. During actual application, hardware for implementing the network device or the UE is not limited to the foregoing structure. For example, the hardware may further include a processor, a memory, an antenna array, a duplexer, and a baseband processing part. The processor may be a central processing unit (CPU), a general-purpose processor, a digital signal processor (DSP), an application-specific integrated circuit ( ), a field programmable gate array (FPGA), or another programmable logical device, a hardware component, or any combination thereof. Alternatively, the processor may be a combination of processors implementing a computing function, for example, a combination of one or more microprocessors, or a combination of the DSP and a microprocessor. The memory may be disposed in a processor, or may exist independently. The duplexer is configured to implement the antenna array and is configured to send and receive signals. The transmitter is configured to implement conversion between a radio frequency signal and a baseband signal. The transmitter may usually include a power amplifier, a digital-to-analog converter, and a frequency converter, and the receiver may usually include a low-noise amplifier, an analog-to-digital converter, and a frequency converter. The receiver and the transmitter may be collectively referred to as a transceiver sometimes. The baseband processing part is configured to: process a sent signal or a received signal, for example, perform layer mapping, precoding, modulation/demodulation, and encoding/decoding, and separately process a physical control channel, a physical data channel, a physical broadcast channel, a reference signal, and the like.

In an implementation, it may be considered that functions of the receiver and the transmitter may be implemented by using a transceiver circuit or a dedicated transceiver chip. It may be considered that the processor may be implemented by using a dedicated processing chip, a processing circuit, a processor, or a general-purpose chip. In another implementation, program code for implementing functions of the processor, the receiver, and the transmitter is stored in the memory, and the general-purpose processor implements the functions of the processor, the receiver, and the transmitter by executing the code in the memory.

Figure 8:
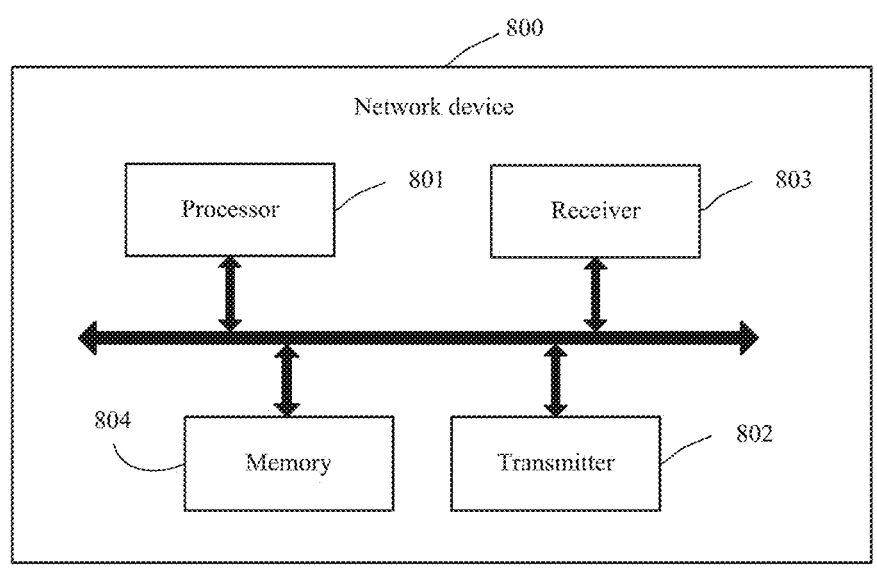
FIG. 8 is a schematic structural diagram of a network device, in accordance with one or more embodiments.
Figure 9:
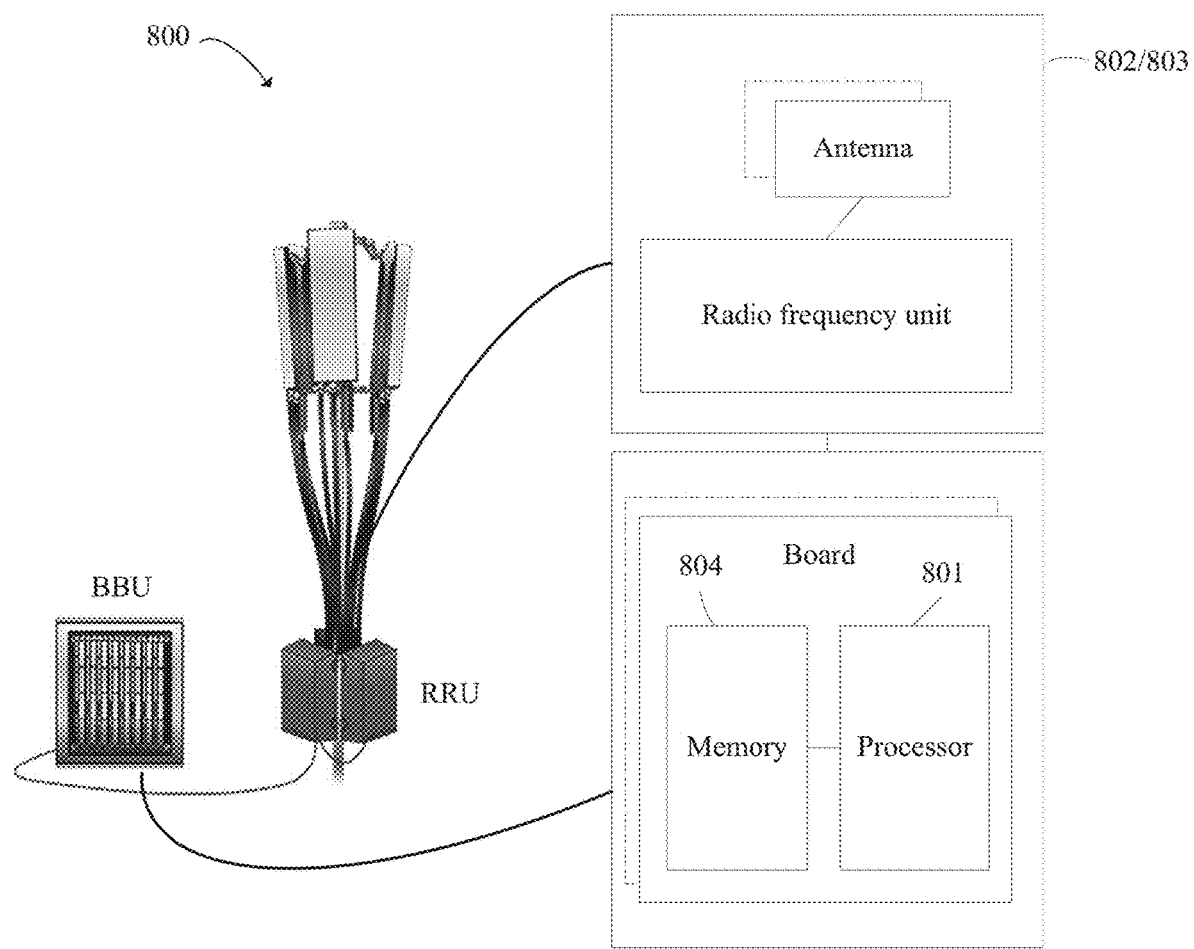
FIG. 9 is a schematic structural diagram of a network device, in accordance with one or more embodiments.

For example, for an implementation example implementations of the network device, refer to FIG. 9 and FIG. 8. As shown in FIG. 9 and FIG. 8, a network device 800 is provided. The network device 800 includes a processor 801, a memory 804, a receiver 803, and a transmitter 802. The receiver 803 and the transmitter 802 are configured to communicate with another network element. The memory 804 is configured to store a program that can be executed by the processor 801. The program includes instructions used to implement the methods, the steps, or the procedures in the foregoing embodiments. For a specific method, process, step, beneficial effect, and the like, refer to description about the content in the foregoing embodiments. Details are not described herein again.

Figure 10:
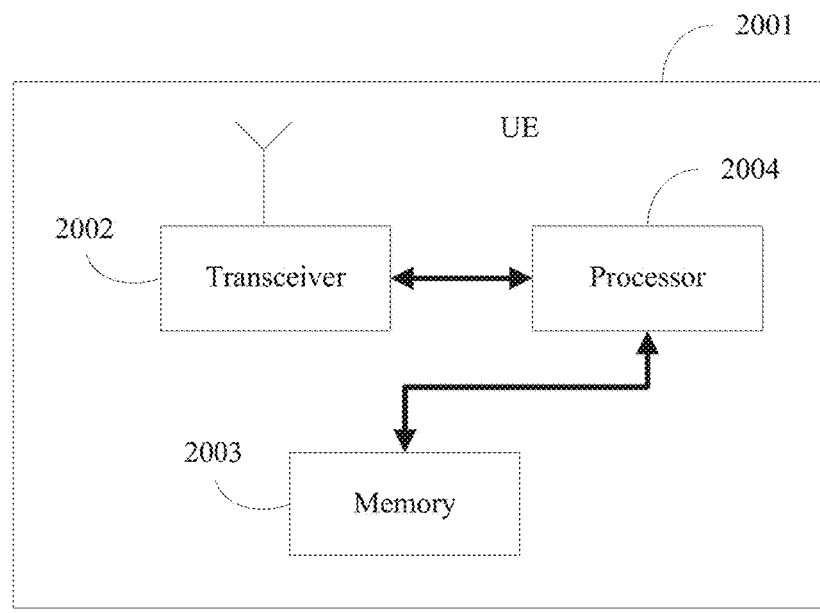
FIG. 10 is a schematic structural diagram of user equipment, in accordance with one or more embodiments.
Figure 11:
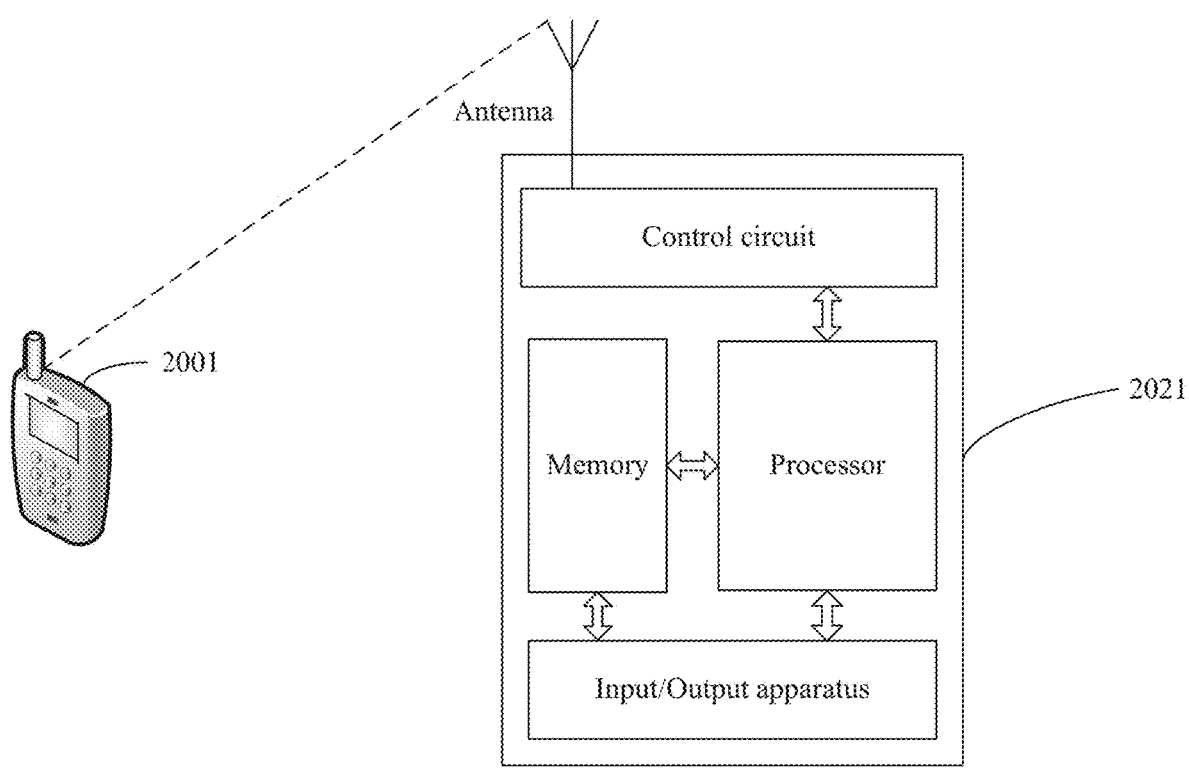
FIG. 11 is a schematic structural diagram of user equipment, in accordance with one or more embodiments.

For example implementations of the UE, refer to FIG. 10 and FIG. 11. As shown in FIG. 10 and FIG. 11, UE 2000 is provided. The UE 2000 including a processor 2004, a memory 2003, and a transceiver 2002. The transceiver 2002 is configured to communicate with another network element 2021 (where the transceiver 2002 may communicate with the another network element 2021 by using an antenna). The memory 2003 is configured to store a program that can be executed by the processor 2004, and the program includes instructions used to implement the methods, the steps, or the procedures in the foregoing embodiments. For a specific method, process, step, beneficial effect, and the like, refer to description about the content in the foregoing embodiments. Details are not described herein again.

When the network device or the UE is implemented by using software, for a concept, an explanation, a detailed description, and other steps related to this application, refer to descriptions about the content in the foregoing methods. All or some embodiments in this application may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive or solid state disk (SSD)), or the like. The storage medium may be integrated in a device, a module, or a processor, or may be disposed separately.

According to the method provided in this application, this application further provides a communications system. The communications system includes the foregoing network device and UE.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A time domain resource indication method, comprising:
processing, by a first node, minimum timing information received from at least one second node to determine an earliest time the at least one second node is available to receive a communication from the first node; and
sending, by the first node, first time domain resource configuration information to the at least one second node at a time ranging from the determined earliest time to a time after the determined earliest time,
wherein
the first time domain resource configuration information is used by the at least one second node to determine second time domain resource configuration information sent by the at least one second node to at least one third node,
the first time domain resource configuration information indicates first time domain resources of a link between the first node and the at least one second node, and
the second time domain resource configuration information indicates second time domain resources of a link between the at least one second node and the at least one third node.

2. The method according to claim 1, further comprising:
sending, by the first node, indication information to the at least one second node,
wherein the indication information indicates a valid-from time domain indicated by the first time domain resource configuration information.

3. The method according to claim 1, further comprising:
sending, by the first node, indication information to the at least one second node,
wherein the indication information indicates a last time domain unit indicated by the second time domain resource configuration information is the same as a last time domain unit indicated by the first time domain resource configuration information.

4. The method according to claim 1, further comprising:
receiving, by the first node, indication information sent by the at least one second node,
wherein the indication information indicates at least some of the second time domain resources.

5. The method according to claim 1, further comprising:
sending, by the first node, indication information to the at least one second node,
wherein the indication information indicates a time domain in which the at least one second node sends the second time domain resource configuration information to the at least one third node.

6. The method according to claim 5, wherein the indication information is first indication information and, before the sending the first indication information to the at least one second node, the method further comprises:
receiving, by the first node, second indication information sent by the at least one second node,
wherein
the second indication information comprises capability information of the at least one second node or a capability class of the at least one second node, and
the capability information or the capability class is used by the first node to determine the time domain in which the at least one second node starts to send the second time domain resource configuration information.

7. The method according to claim 1, further comprising:
determining, based on at least some of the first time domain resources indicated by the first time domain resource configuration information, at least some of the second time domain resources indicated by the second time domain resource configuration information.

8. The method according to claim 7, wherein the first time domain resources comprise one or more of uplink time domain resources of first used time domain resources, downlink time domain resources of the first used time domain resources, or first unused time domain resources; or
the second time domain resources comprise one or more of uplink time domain resources of second used time domain resources, downlink time domain resources of the second used time domain resources, or second unused time domain resources.

9. The method according to claim 8, wherein the method further comprises determining one or more of:
uplink time domain resources of at least some of the second time domain resources are the same as at least some of the first unused time domain resources;
uplink time domain resources of at least some of the second time domain resources are the same as downlink time domain resources of at least some of the first used time domain resources;
downlink time domain resources of at least some of the second time domain resources are the same as at least some of the first unused time domain resources; or
downlink time domain resources of at least some of the second time domain resources are the same as uplink time domain resources of at least some of the first used time domain resources.

10. The method according to claim 9, wherein
the first time domain resources comprise one or more of uplink time domain resources of the first unused time domain resources, or downlink time domain resources of the first unused time domain resources; or
the second time domain resources comprise one or more of uplink time domain resources of the second unused time domain resources, or downlink time domain resources of the second unused time domain resources.

11. The method according to claim 10, wherein
the uplink time domain resources of the at least some of the second time domain resources are the same as uplink time domain resources of at least some of the first unused time domain resources; or
the downlink time domain resources of the at least some of the second time domain resources are the same as downlink time domain resources of at least some of the first unused time domain resources.

12. A time domain resource indication method, comprising:
sending, by a first node, minimum timing information to a second node to prevent the second node from sending a communication to the first node before an indicated earliest time the first node is available to receive the communication from the second node;
receiving, by the first node, first time domain resource configuration information sent by the second node at a time ranging from the indicated earliest time to a time after the indicated earliest time,
determining, by the first node, second time domain resource configuration information based on the first time domain resource configuration information; and
sending, by the first node, the second time domain resource configuration information to at least one third node, wherein
the first time domain resource configuration information indicates first time domain resources of a link between the second node and the first node, and the second time domain resource configuration information indicates second time domain resources of a link between the first node and the at least one third node.

13. The method according to claim 12, further comprising:
receiving, by the first node, indication information sent by the second node,
wherein the indication information indicates a valid-from time domain indicated by the first time domain resource configuration information.

14. The method according to claim 12, further comprising:
receiving, by the first node, indication information sent by the second node,
wherein the indication information indicates a last time domain unit indicated by the second time domain resource configuration information is the same as a last time domain unit indicated by the first time domain resource configuration information.

15. The method according to claim 12, further comprising:
sending, by the first node, indication information to the second node,
wherein the indication information indicates at least some of the second time domain resources.

16. The method according to claim 12, further comprising:
receiving, by the first node, indication information sent by the second node, wherein the indication information is used to indicate a time domain in which the second configuration information is sent.

17. The method according to claim 16, wherein the indication information is first indication information and, before the receiving, the first indication information sent by the second node, the method further comprises:
sending, by the first node, second indication information to the second node,
wherein
the second indication information comprises capability information of the first node or a capability class of the first node, and
the capability information or the capability class is used by the second node to determine the time domain in which the first node sends the second time domain resource configuration information.

18. The method according to claim 12, further comprising:
determining, by the first node based on at least some of the first time domain resources indicated by the first time domain resource configuration information, at least some of the second time domain resources indicated by the second time domain resource configuration information.

19. An apparatus, comprising:
at least one processor; and
a memory having computer readable instructions stored thereon that, when executed by the at least one processor, cause the apparatus to:
process minimum timing information received from at least one node to determine an earliest time the at least one node is available to receive a communication from the apparatus;
send first time domain resource configuration information to the at least one node at a time ranging from the determined earliest time to a time after the determined earliest time; and
send indication information to the at least one node, wherein
  the first time domain resource configuration information is used to determine second time domain resource configuration information sent by the at least one node,
  the first time domain resource configuration information indicates first time domain resources of a link between the apparatus and the at least one node,
  the second time domain resource configuration information indicates second time domain resources of a link between the at least one node and at least one other node, and
  the indication information indicates a valid-from time domain indicated by the first time domain resource configuration information.

20. The apparatus according to claim 19, wherein the indication information is first indication information, and the apparatus is further caused to:
  send second indication information to the at least one node, the second indication information being indicative of a time domain in which the at least one node sends the second time domain resource configuration information to the at least one other node;
  receive third indication information sent by the at least one node, the third indication information comprising capability information of the at least one node or a capability class of the at least one node; and
  determine the time domain in which the at least one node starts to send the second time domain resource configuration information based on the capability information or the capability class.

* * * * *